March 3, 1942.  F. R. SPINNEY  2,274,996
VALVE
Filed July 31, 1940

INVENTOR
FRANK R. SPINNEY
BY
Angelo M. Pisarra
ATTORNEY

Patented Mar. 3, 1942

2,274,996

UNITED STATES PATENT OFFICE 2,274,996

VALVE

Frank R. Spinney, Oklahoma City, Okla., assignor to Duplex Spherical Valve Co. Inc., a corporation of Oklahoma Application July 31, 1940, Serial No. 348,868

4 Claims. (Cl. 251—129)

This invention relates to valves and in its more specific aspect to improvements in valves for the control of the flow of fluids.

Heretofore, in the conventional type valves, such as the well known flat disc type valves and the ball type valves, the characteristic which primarily determined their efficiencies was the fit between the valve and valve seat. In those valves the valve and seat are originally formed to fit each other, and many times the reason for the misfitting of the surfaces thereof has been due to the presence of foreign matter between valve and seat. The tapered seat was primarily designed to provide a self cleaning seating surface so that foreign solid matter tended to slide off of the surface. The ball valve was designed to give proper alignment of valve and seat at all times. The advantages of the disc tapered seat valve over the ball valve is its compactness and lightness over the ball valve of the same size.

An object of this invention is to overcome the disadvantages of the prior art valves.

Another object of this invention is to provide a valve having the advantages of both the disc tapered seat valve and the ball valve whereby the valve will include a self cleaning valve seat and at the same time afford a valve and seat that are at all times in perfect alignment.

Another object of this invention is to provide a valve which is of the compact spherical type valve, of great strength, lightness and durability and is adapted to shift its position until perfect seating is effected and further to afford an unobstructed opening through the valve seat.

Another object of this invention is to provide a unit valve comprising a valve seat, guide, valve stop and valve, so combined that the valve lift may be readily varied at will.

These as well as other objects of this invention will be readily apparent from the following description and appended drawing, wherein Figure 1 represents a view in side elevation of the valve assembly embodying the invention.

Figure 1:
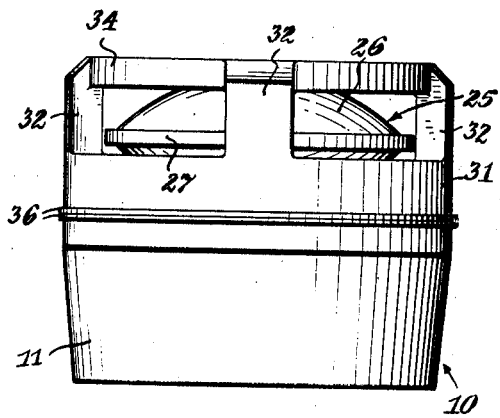
Figure 2:
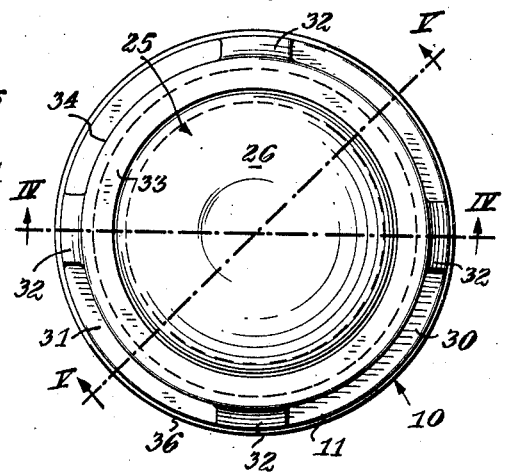
Figure 2 represents a top elevation of the valve assembly shown in Figure 1.

As shown in the drawing the assembly may comprise a hollow sleeve or body 10. The hollow body 10 may consist of a main hollow body portion 11 of generally annular cross sectional contour and having an outer surface gradually tapered downwardly inward and adapted to fit the pump surface into which it is to be installed.

The upper part of the main body portion 11 is in the form of an inwardly extending lip 12 of considerable depth and having an interior cylindrical surface 13 substantially concentric with the lower interior surface of main body 11. The lip 12 has an upper surface or shelf 14 and a lower surface 15. Integral with said main body 11 and lip 12 are a plurality of lugs or ribs 16 which extend downwardly from the lower surface 15 of lip 12 and inwardly from the inner surface of main body 11. These lugs are of appreciable width and the innermost faces 17 thereof are flush with the inner face 13 of lip 12. The lugs 16 terminate about half way between the lower extremity of main body 11 and the lower face of lip 12. The lugs 16 and the lower surface of lip 12, which serves as a shoulder, facilitate tightening the valve body in the pump and withdrawing it from the pump.

Integral and concentric with said main body 11 and extending upwardly therefrom is an annular ring 18 whose internal diameter is materially greater than the corresponding dimension of lip 12 and whose outer diameter is materially less than the external diameter of the uppermost part of main body 11 to define a pair of shoulders 14 and 19. Extending around the entire inner circumference of the lower part of ring 18 is a lock groove 20. Resting on the shoulder 14 is a valve insert 21 composed of any well known material suitable for the fluid and operating characteristics common with the work to be done. This valve insert 21 may also be an annular ring, and it fits snugly and tightly along the inner surface of ring 18 and on shoulder 14.

The inner surface 22 of insert 21 is flush with the inner surface of lip 12 and the upper surface 23 of insert 21 is flush with the upper surface of ring 18. The inner and upper part of insert 21 is concave to provide a valve seat 24 whose contour is complementary to the exterior surface of valve 25 hereinafter described. I prefer that the composition of the insert 21 be of a softer metal or material than that of the lip 12 and the valve hereinafter described. Normally resting on the valve seat 24 is a valve 25 which may be a single unitary element consisting of a pair of oppositely disposed parts 26 of a hollow sphere.

The shallow dishlike parts 26 are integral with each other and have a flange 27 extending around the entire circumference of said parts 26 at the junction thereof. I prefer that the part 26 be a segment of a hollow sphere whose external radius of curvature is materially greater than and preferably at least twice as great as the internal radius of insert 21. The parts 26 have the same radii and are integral or secured to each other along their circular surfaces to provide a hollow relatively "flat," light and rugged valve. The outer circular limits of the parts 26 are located materially outwardly beyond the external surface of insert 21, and the flange 27 is of appreciable width and is located above and slightly within the outer limit of annular ring 18.

The outer surface of ring 18 is threaded at 28 and this threaded surface 28 is adapted to cooperate with the internally threaded lower ring section 30 of valve guide 31. The valve guide 31 also includes four relatively narrow bars or lugs 32, spaced from each other and being about 90° apart.

The lugs 32 are integral with ring 30, extend upwardly therefrom, and are of the same length. Integral with the lugs 32 at the upper ends thereof and extending inwardly therefrom is a narrow flange 33 whose internal diameter may be greater than the internal diameter of ring 18, but less than the external diameter of flange 27. Depending from the flange 33 is a narrow skirt 34 which also connects the lugs 32 to each other. The upper outer ends of the lugs 32 are beveled downwardly outward and the diameter of the outer surface of the flange 33 is less than the outer diameter of main body 11, as well as the outer diameter of ring 30 which is the same as the outer diameter of the main body 11. It is preferable that the internal diameter of the flange 33 be slightly greater than the internal diameter of flange 27.

Figure 4:
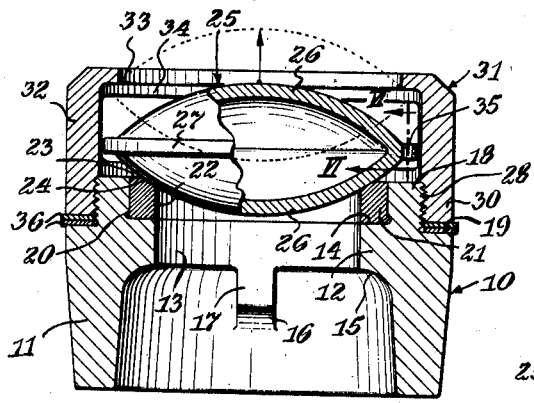
Figure 4 is a cross sectional view taken on line IV—IV of Figure 2 and with part of the valve being shown in elevation.
Figure 3:
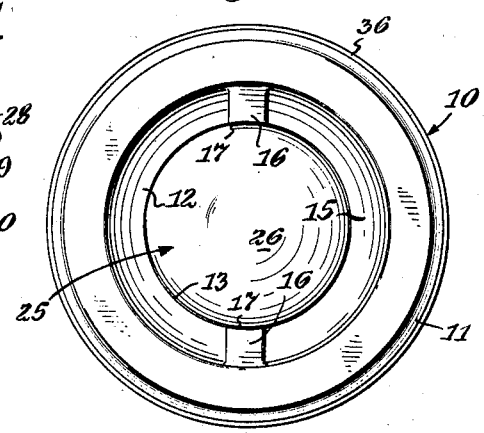
Figure 3 is a bottom view of the valve assembly shown in Figure 1.
Figure 5:
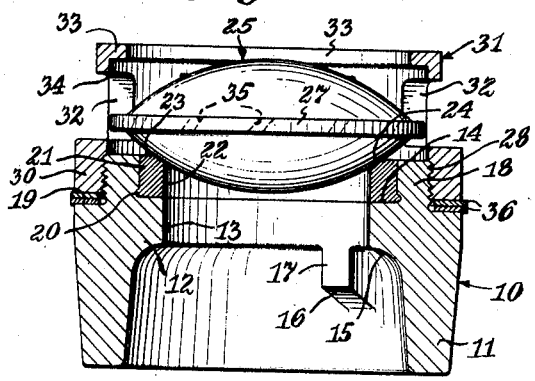
Figure 5 is a cross sectional view taken on line V—V of Figure 2 and with part of the valve being shown in elevation.
Figure 6:
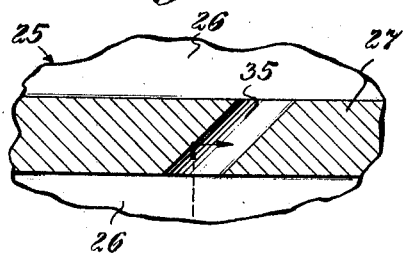
Figure 6 is a fragmentary sectional view of the valve, showing holes in the flange, and taken on line VI—VI of Figure 4.

The valve 25, which consists of two equal segments 26 taken from the same sphere are hermetically sealed together at their edges as shown and together with the flange 27 is located in the cage or guide 31 as shown in Figures 1, 4 and 5. Spaced about 30° apart are openings 35 in flange 27. These openings extend through said flange and are inclined at an angle of 45° to the vertical.

The relative position of the flange 33 of guide 30 may be varied with respect to the valve seat 24 and for this purpose there are provided shims 36 or the like which may rest on the shoulder 19. With the shims 36 in place and the valve 25 resting on the valve seat 24, the guide or cage 31 may be threadedly secured to the ring 18. By means of a suitable wrench engaging one or more of the lugs 32, the cage 31 may be turned down to force shims 36 against shoulder 19 to make a tight fit therewith.

In the event the distance between the valve seat and flange seat is to be varied, the cage guide 31 may be unscrewed from ring 18 and more shims may be added to the two shown or one or more of shims 36 may be removed, and then the guide 31 is again mounted on ring 17 and screwed down in position.

In operation, fluid may be forced upwardly through the interior of the main body 11 by the action of a pump. The fluid under pressure passes upwardly through the opening in lip 12 and insert 21 and against the valve 25 to raise the valve 25 off its seat 24. As the valve 25 is raised off seat 24 and maintained in this position by the fluid pressure, the fluid flows through the openings between lugs 32 of guide 31. The maximum upper position that the valve 25 may attain is controlled by position of the flange 33. When the valve has attained its uppermost position, the flange 27 bears against flange 33. By having the flange 33 located from the valve seat 24 a distance materially less than the diameter of flange 27, there is obviated any danger of the valve turning over. In order that this condition may be permanently fixed, the distance from the lower surface of flange 33 to the lower extremity of ring 30 is preferably less than the radius of the outer surface of flange 27. Thus no matter how many shims 36 are mounted on shoulder 19, it is not possible to secure the guide 31 to ring 18 and have the flange 33 located from seat 24 a distance greater than the radius of the external surface of flange 27.

With this construction, the dangers of the valve jamming between the guide 31 and insert 21 and of the valve turning over are completely obviated and cannot occur, no matter what the workman does. Because of the holes 35 the valve is oscillated and when it returns to its closing position on seat 24, the valve will seat at a different portion of the surface thereof. In case some foreign matter is located between the valve 25 and seat 24, the flow of fluid through that portion of the opening adjacent the foreign matter thereby causes an unbalanced pressure on the flange 27 whereupon the valve 25 is caused to rotate and due to this rotation the foreign matter is moved off the seat 24 and valve 25 completely seats on seat 24 and forms a perfect seal therewith. Due to the pounding of the valve 25 on the insert 21, the malleable metal of insert 21 flows into the groove 20 to form a lip or ledge which anchors and locks the insert on to the shoulder 14 so that the insert may not become accidentally displaced from the body 10. Because of the particular size and relationship of parts and especially because of flange 27, the valve may be of large diameter so that the pump will not choke and more volume of fluid may be pumped per minute with fewer revolutions per minute of the pump.

Although the invention has been described in detail, it is not to be limited thereby, because the same is subject to modifications within its scope as defined by the claims.

What is claimed is:

1. A valve structure comprising a hollow main body, a narrow shelf secured to said body and extending inwardly therefrom, retaining means secured to said body and extending upwardly therefrom, said retaining means having a lock groove in the inner portion thereof and coupling means in the outer part thereof, the inner surface of said retaining means located outwardly from the inner surface of said shelf and the outer surface of said retaining means located inwardly from the outer surface of said body, a cage guide demountably coupled to said coupling means, stop means secured to said guide, a valve seat mounted on said shelf and locked in said groove, a valve located within said cage, said valve comprising a pair of oppositely disposed substantially identical segments of a hollow sphere secured to each other, the radius of curvature of each of said segments being at least twice as great as the internal radius of said seat, a flange secured to said segments along the line of their juncture and extending outwardly therefrom, the internal diameter of said stop means being less than the corresponding dimension of the outer limit of said flange, said cage having an opening in the upper part thereof, in its extreme upper position a portion of one of said segments extending through said opening and the upper face of said flange bearing against the inner face of said stop, in its extreme lower position a portion of only the other segment being contiguous with said valve seat and the lower face of said flange being spaced from said retaining means.

2. In a valve structure comprising a hollow main body, a valve seat and a cage secured to said body; a valve adapted to seat on said valve seat to prevent the flow of liquid therebetween, said valve comprising a pair of substantially identical segments of a hollow sphere, said segments being oppositely disposed and mounted in alignment one above the other with the circular edges thereof being substantially coincidental and a narrow flange extending around said segments along the line of their juncture, said flange having a plurality of openings therethrough, said opening disposed at an angle to the minor axis of said valve, said cage including an annular stop ring, in extreme upper position the upper segment of said valve extending through said opening and said flange bearing against said ring, in extreme lower position only the lower segment bearing against said valve seat and said flange being spaced from said main body.

3. In a valve structure comprising a hollow main body, valve seat and cage secured to said body; a valve adapted to seat on said valve seat to prevent the flow of fluid therebetween, said valve comprising a pair of substantially identical segments of a hollow sphere whose radius is at least twice as great as the internal diameter of said valve seat, said segments mounted one on top of the other with their edges being in approximate coincidence and secured to each other, a narrow flange secured to said segments along the line of their juncture, the diameter of said segments being materially greater than the diameter of said seat, said flange having a plurality of openings therethrough, said openings being inclined to the minor axis of said valve, said cage including an annular stop ring, in extreme upper position the upper segment of said valve extending through said opening and said flange bearing against said ring, in extreme lower position only the lower segment bearing against said valve seat and said flange being spaced from said main body.

4. A valve structure comprising a hollow main body, a valve seat, a cage demountably secured to said body and a valve adapted to be moved off said valve seat, said valve comprising a pair of similar segments of a hollow sphere, said segments being oppositely disposed and connected to each other and a flange extending outwardly from said segments along the line of juncture, the diameter of the outer surface of said flange being less than the greatest internal diameter of said cage, said cage including an annular stop means for said valve, said stop means being at the upper part of said cage and having an internal diameter less than the external diameter of said flange, said valve at one extreme position adapted to have a portion thereof extend through said annular stop means while said flange bears against said stop, and at the other extreme position only the curvilinear portion of said valve being in contact with said valve seat and the lower face of said flange being spaced from said body.

FRANK R. SPINNEY.